United States Patent [19]

Eminger et al.

[11] Patent Number: 4,991,631
[45] Date of Patent: Feb. 12, 1991

[54] LEAD STRAIGHTENING AND TRIMMING APPARATUS

[75] Inventors: Robert J. Eminger, Ft. Wayne; Bueford Ebert, Kendallville; Paul R. Russell, Roanoke; Donald L. Van Gilder, Ft. Wayne, all of Ind.

[73] Assignee: Pease Windamatic Systems, Inc., Fort Wayne, Ind.

[21] Appl. No.: 403,940

[22] Filed: Sep. 7, 1989

[51] Int. Cl.⁵ ................................................ B21F 1/02
[52] U.S. Cl. ..................................... 140/140; 140/147
[58] Field of Search ................................ 140/140, 147

[56] References Cited

U.S. PATENT DOCUMENTS

| | | | |
|---|---|---|---|
| 3,144,889 | 8/1964 | Cole | 140/140 |
| 3,225,797 | 12/1965 | Stoody | 140/147 |
| 4,648,176 | 3/1987 | Moser | |
| 4,723,354 | 2/1988 | Moser | |

Primary Examiner—Lowell A. Larson
Attorney, Agent, or Firm—Pearne, Gordon, McCoy & Granger

[57] ABSTRACT

A lead straightening and trimming apparatus for the leads of electrical components such as stators. The apparatus includes a pallet having positioning posts which position the stators on the pallet and also position coils within the stator. The apparatus also includes a rotating helical pick-up tool which is movable between a retracted position and an extended position adjacent to a component supporting pallet having lead retaining posts. The pick-up tool operates to capture the free ends of leads extending from posts provided by the pallets. Upon retraction, the pick-up tool moves the associated free ends of the leads to a partially straightened gripping position. The apparatus also includes a combined gripper straightening and cutting apparatus which grips the associated lead adjacent to the pallet post with a force insufficient to cut the lead. Retraction of the gripper straightens the portion of the lead extending from the retaining post of the pallet. The gripper is then released to release tension in the lead. The straightener cutter then cuts the lead along the straightened portion at a predetermined distance from the post.

18 Claims, 8 Drawing Sheets

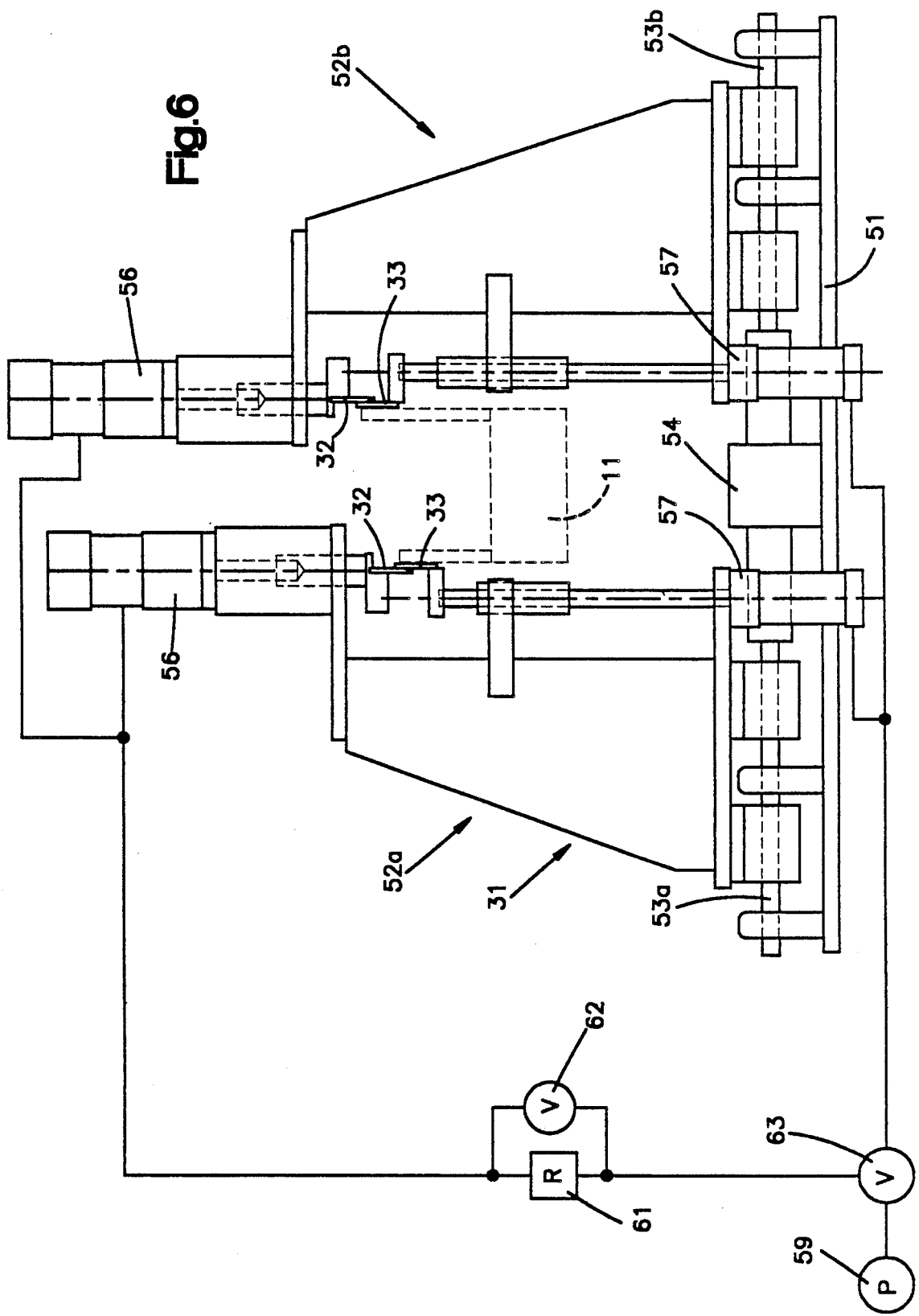

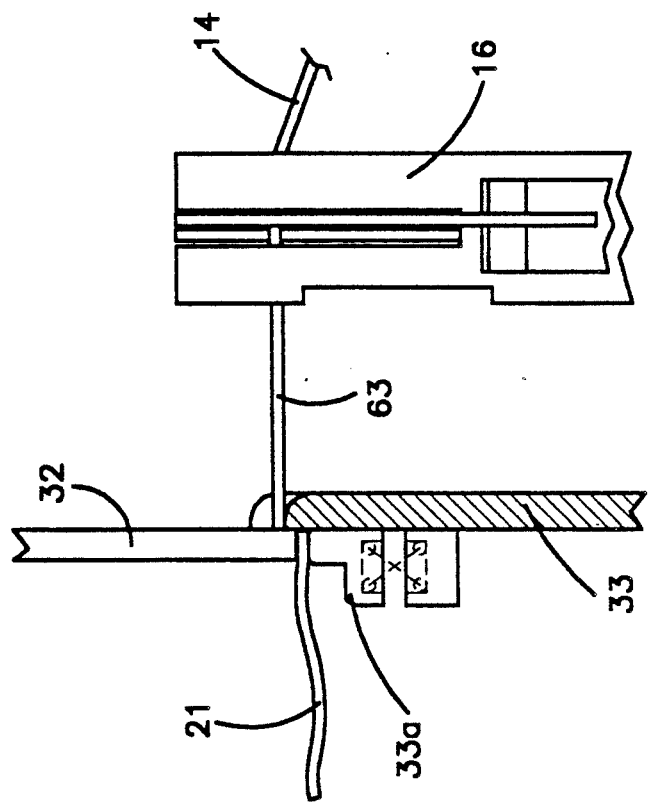
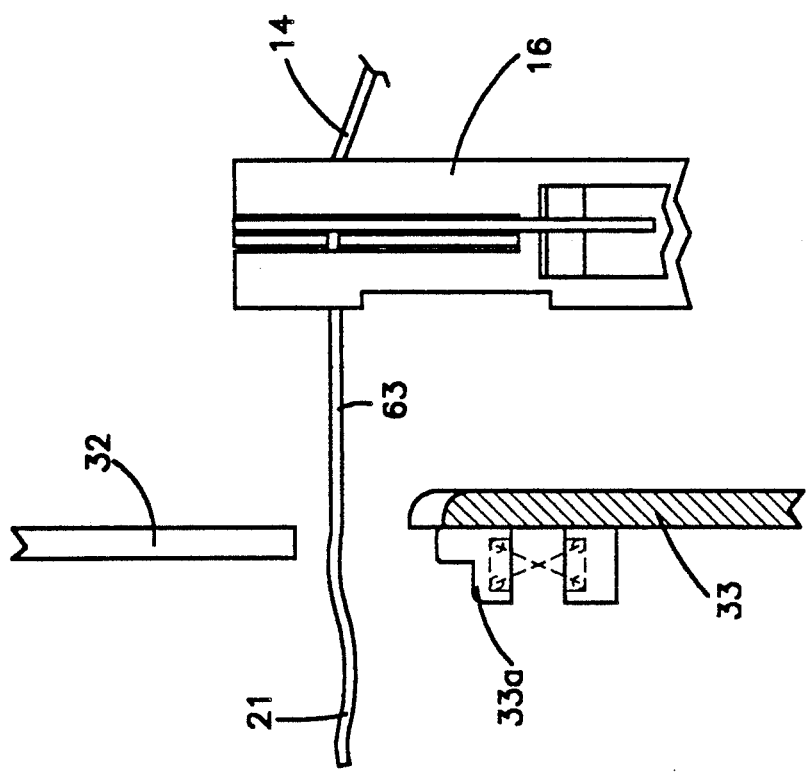

LEAD STRAIGHTENING AND TRIMMING APPARATUS

BACKGROUND OF THE INVENTION

This invention relates generally to the manufacture of electrical components such as stators and the like, and more particularly to a novel and improved method and apparatus for straightening, trimming and finishing of lead wires of such components.

PRIOR ART

The manufacture of electrical devices such as electric motor components has become highly automated. For example, automated systems have been developed for the manufacture of stators having coils installed therein. In one such system described in U.S. Pat. Nos. 4,648.176 and 4,723,254, coil leads are positioned in retaining apertures in an stator carrying pallet during a portion of the assembly process. Subsequently, a rotating helical pick-up tool engages the leads, removes the leads from the retaining apertures, and transfers such leads from the retaining apertures to the lead cutting assembly for further processing. Such systems require a relatively complex apparatus to first position the leads in the retaining apertures and to thereafter transfer the leads to the cutting assembly. Such patents are incorporated herein by reference to illustrate the background of the present invention.

SUMMARY OF THE INVENTION

The present invention provides a novel and improved method and apparatus for straightening and finishing wire leads of electrical components, such as stators, coils, and the like.

In the illustrated embodiment, stators having coils are assembled on pallets that move along a conveyor system to the various work stations of the overall assembly system. When the pallets and stator assemblies reach the straightener and trimmer of this invention, the coil leads have been manually positioned in post retainers provided by the pallet. The free ends of the leads project from the post retainers in a random manner.

The pallets also provide positioning posts which function to retain the coils in position within the stators until they are stitched.

The randomly oriented leads are engaged by a rotating helical pick-up tool which moves to a position immediately adjacent to the post retainer to capture the leads. The pick-up tool then retracts and pulls the free ends of the coil leads out away from the retainer post. This causes a preliminary straightening of the leads and positions the leads within a known range of positions with respect to the associated retainer post. The leads are sufficiently stiff to maintain their extended position when the pick-up tools retract clear of the ends of the leads.

The conveyor then moves the pallet and partially straightened leads to a work station, where the leads are fully straightened and trimmed to length. At this work station, a gripper closes on the leads adjacent to the retainer post. The gripper then retracts, exerting sufficient tensile force on the leads to fully straighten the portion of the lead extending from the retainer post.

After the grippers retract and fully straighten the portion of the lead, the grippers release their grip to release the tension in the leads. Thereafter, the leads are trimmed to length. By releasing the tension prior to trimming, the cut lead length extending from the post is accurately maintained. In the illustrated embodiment, the grippers that function to straighten the leads also cut or trim the leads.

During the straightening operation, the grippers grip the leads with a low force which does not cut the leads but provides sufficient gripping to produce sufficient tensile forces within the lead to cause the lead to straighten fully. As the grippers retract, they slide along the lead surface and straighten portions of the leads.

In accordance with the method of the present invention, the positioning posts of the pallets position the stators and hold the coils in proper position within the stators. The randomly oriented lead ends are first captured and pulled out away from the retaining post to provide a preliminary straightening and positioning. This preliminary positioning permits reliable gripping for final straightening and trimming operations.

Thereafter, the leads are gripped and sufficient tension is applied to fully straighten the portion of the lead extending from the support post. After straightening, the tension in the lead is released and the lead is cut to required length.

In accordance with the apparatus of this invention, the pallet positioning posts function to position the stator in the pallet and also position the coils within the stator. The retainer posts grip and position the coil leads. A simple helical pick-up is provided to capture randomly oriented lead ends. This pick-up operates to perform a preliminary straightening and positioning operation. The final straightening and trimming operations are performed by a combination gripper and cutter. During the straightening, the cutter grips the leads with a low force and, after straightening, sufficient force is applied to cut the wire.

These and other aspects of this invention are illustrated in the accompanying drawings, and are more fully described in the following specification.

BRIEF DESCRIPTION OF THE DRAWINGS

FIG. 6 is a vertical, lateral schematic view of the final straightening and cutting station;

FIG. 7c is a fragmentary view similar to FIGS. 7 through 7b, illustrating the straightener cutter blades at the completion of the straightening operation and after the straightened lead is released; and FIG. 7d is a fragmentary view similar to FIGS. 7 through 7c, illustrating the straightener and cutter blades after the excess material of the lead is cut away leaving a straightened lead of predetermined length on which a connector is subsequently installed.

DETAILED DESCRIPTION OF THE DRAWINGS

Figure 1:
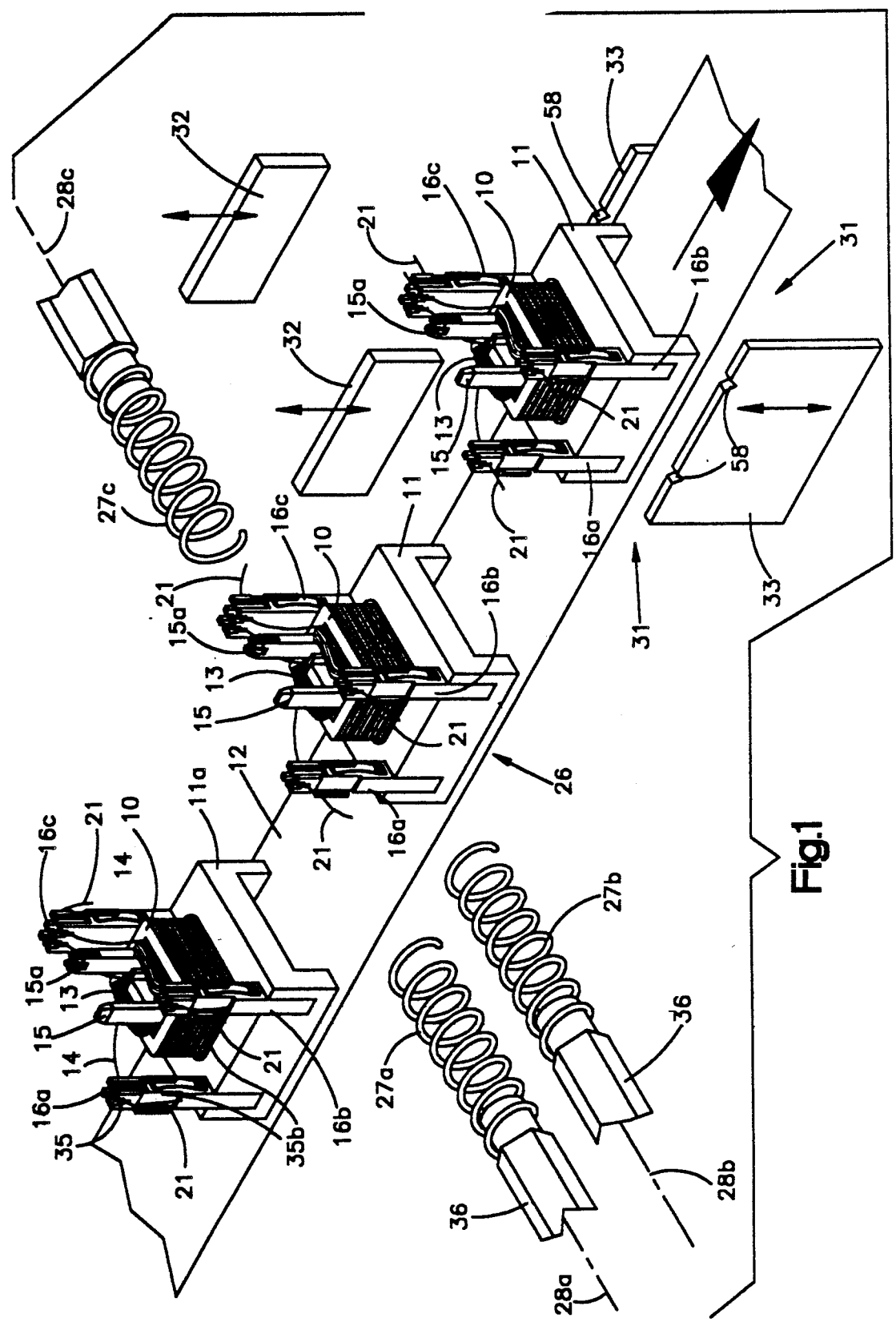
FIG. 1 is a schematic, perspective view of the lead straightening trimming system in accordance with the present invention.

FIG. 1 schematically illustrates the overall system for capturing, straightening and trimming the leads of an electrical component. In this instance, the electrical component is a motor stator 10 carried by a pallet 11. Each of the stator supporting pallets 11 is moved by a conveyor, schematically illustrated at 12, to the various stations at which operations are performed. The coils 13 are wound and positioned within the stator prior to reaching the straightening and trimming stations illustrated in FIG. 1. The coils each provide two leads 14 which must be straightened and finished in a reliable manner.

Prior to reaching the locations illustrated in FIG. 1, the coils are installed in the stators and the coil and stator assembly is positioned on the pallet. The positioning posts 15 extend up through the stator to position the stator on the pallet and also to hold the coils in position within the stators. Because the posts 15 extend up a substantial distance, they also function to guide the stator into its installed position. The leads 14 are positioned in associated retainer posts 16 prior to reaching the position of FIG. 1. In the illustrated embodiment, the pallets 11 each provide two retainer posts 16a and 16b on one side and a double retainer post 16c on the opposite side. Each of the retainer posts 16a and 16b provides spring-loaded grippers 17, best illustrated in FIG. 2. These grippers provide gripper jaws which are biased by associated springs 19 toward a gripping position.

In the illustrated assembly, the leads 14 are manually positioned in the associated grippers on the two posts 16a and 16b so that the free ends 21 of the leads extend down along the associated posts. Similarly, the double post 16c on the opposite side of the pallet provides two grippers 17 positioned to receive two additional leads 14, with one lead positioned in each of the two grippers 17. Here again, the free ends 21 of the leads extend beyond the associated grippers 17 and down along the side thereof. The positioning post 15a provides a support on which a motor protector (not illustrated) can be mounted.

Figure 2:
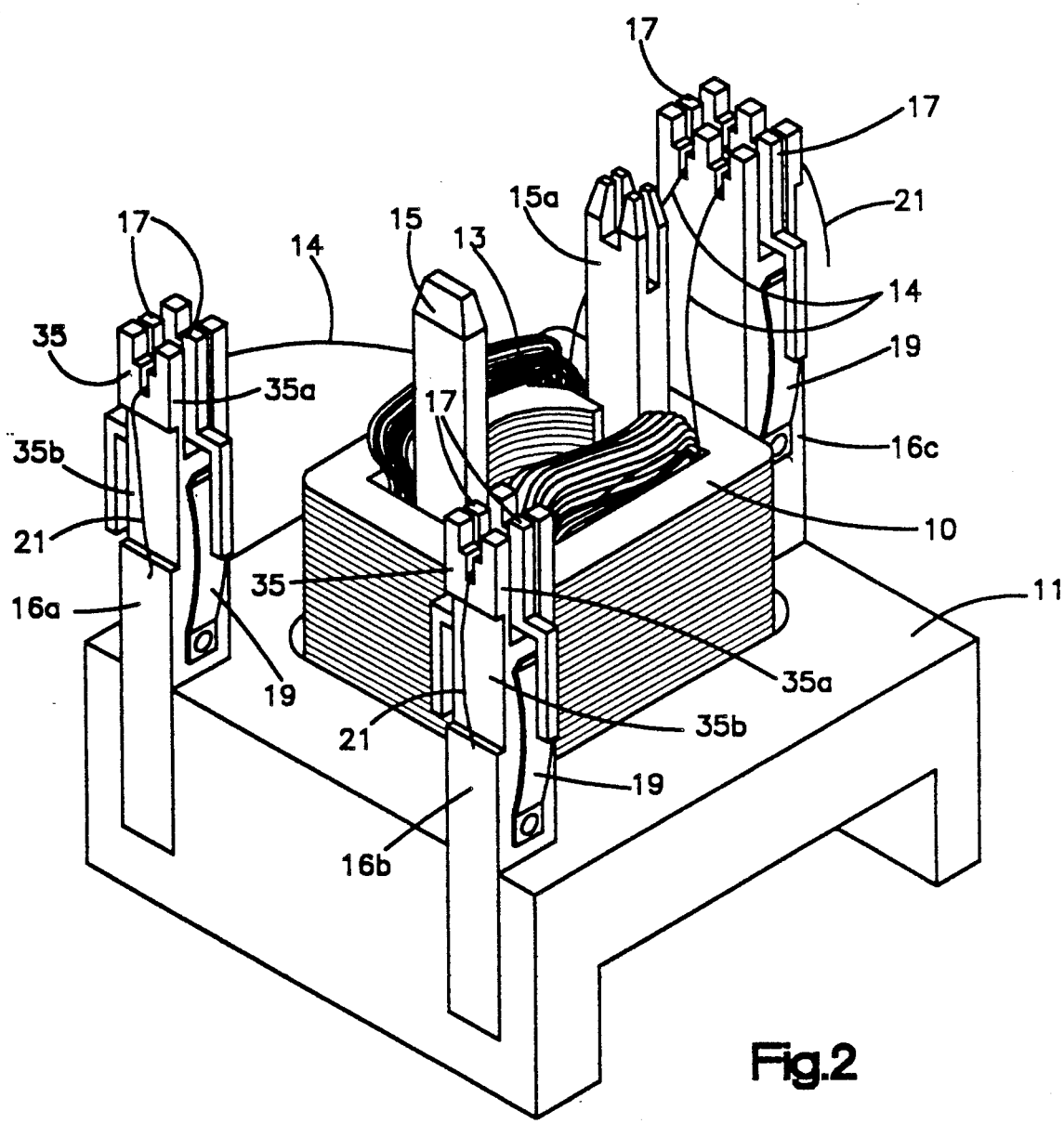
FIG. 2 is an enlarged perspective view of the pallet and supported stator.

FIG. 1 (at the pallet position 11a) and FIG. 2 illustrate the stator and leads prior to the straightening and trimming operation. The free ends 21 of the leads are illustrated positioned so that they extend down along the associated retainer post 16. However, the straightening and trimming structure of the present invention can capture, straighten and trim the leads having free ends which extend in a random manner from the associated gripper 17.

Located at a capturing station 26 are three helical pick-ups 27a, 27b and 27c. The two pick-ups 27a and 27b are respectively aligned with the retainer posts 16a and 16b. The pick-up 27c is aligned with the double retainer post 16c. The three helical pick-ups 27a through 27c rotate about an associated axis 28a, 28b and 28c, and are movable between a retracted position illustrated in FIG. 1 and an extended position in which the pick-ups are located immediately adjacent to the associated retainer posts. As described in greater detail below, the rotating pick-ups 27 capture the associated free end 21 of the associated lead and, upon retraction, pull such leads out to a preliminary straightened position in which they extend generally perpendicular to the associated retainer post.

The pallets with the partially straightened leads are then carried by the conveyor 12 to the final straightening and trimming or cutting station 31. Located at such straightening and cutting station are two pairs of straightener cutters with one pair on each side of the conveyor and each pair consisting of an upper straightening and cutting blade 32, a lower straightening and cutting blade 33, and an associated pressure (as best illustrated in FIG. 7). These straightening and cutting blades function first to straighten a portion of the free ends of each lead extending from the associated retainer post and subsequently operate to cut the leads a predetermined distance from the associated retainer post. The manner in which this is accomplished is described in detail below.

Figure 3:
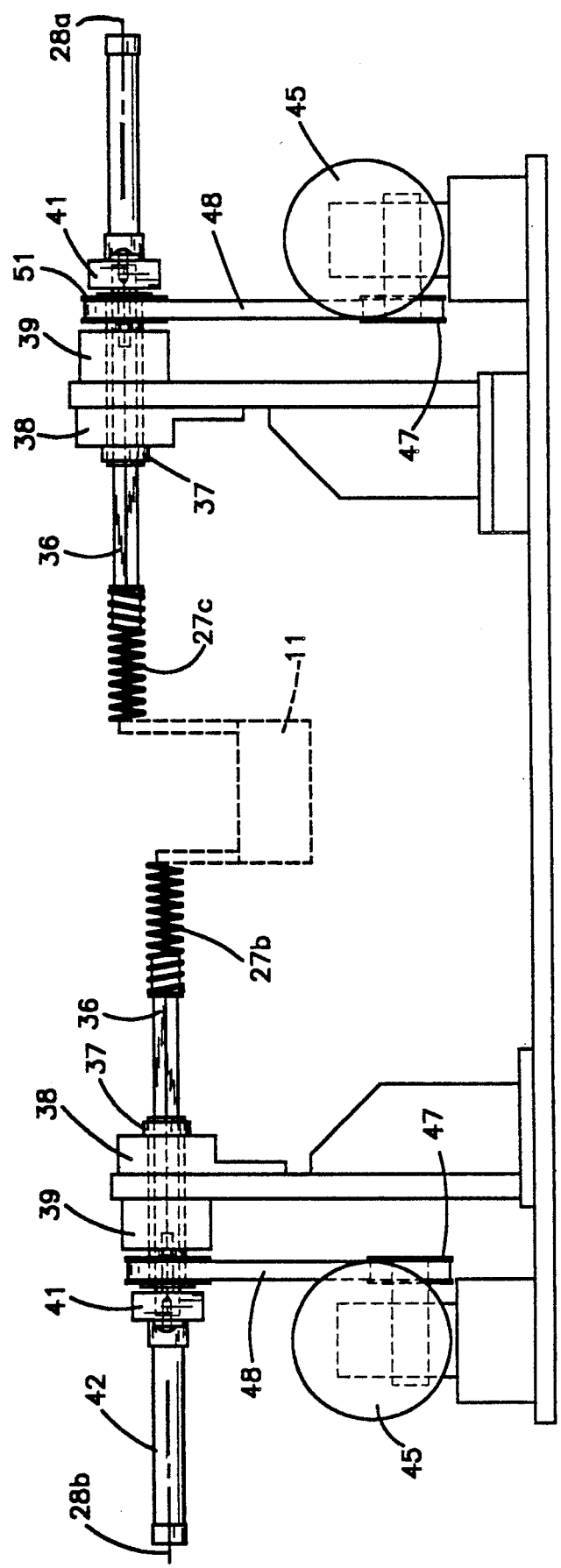
FIG. 3 is a vertical, lateral view of the pick-up station, schematically illustrating the helical pick-ups and their drive.
Figure 4:
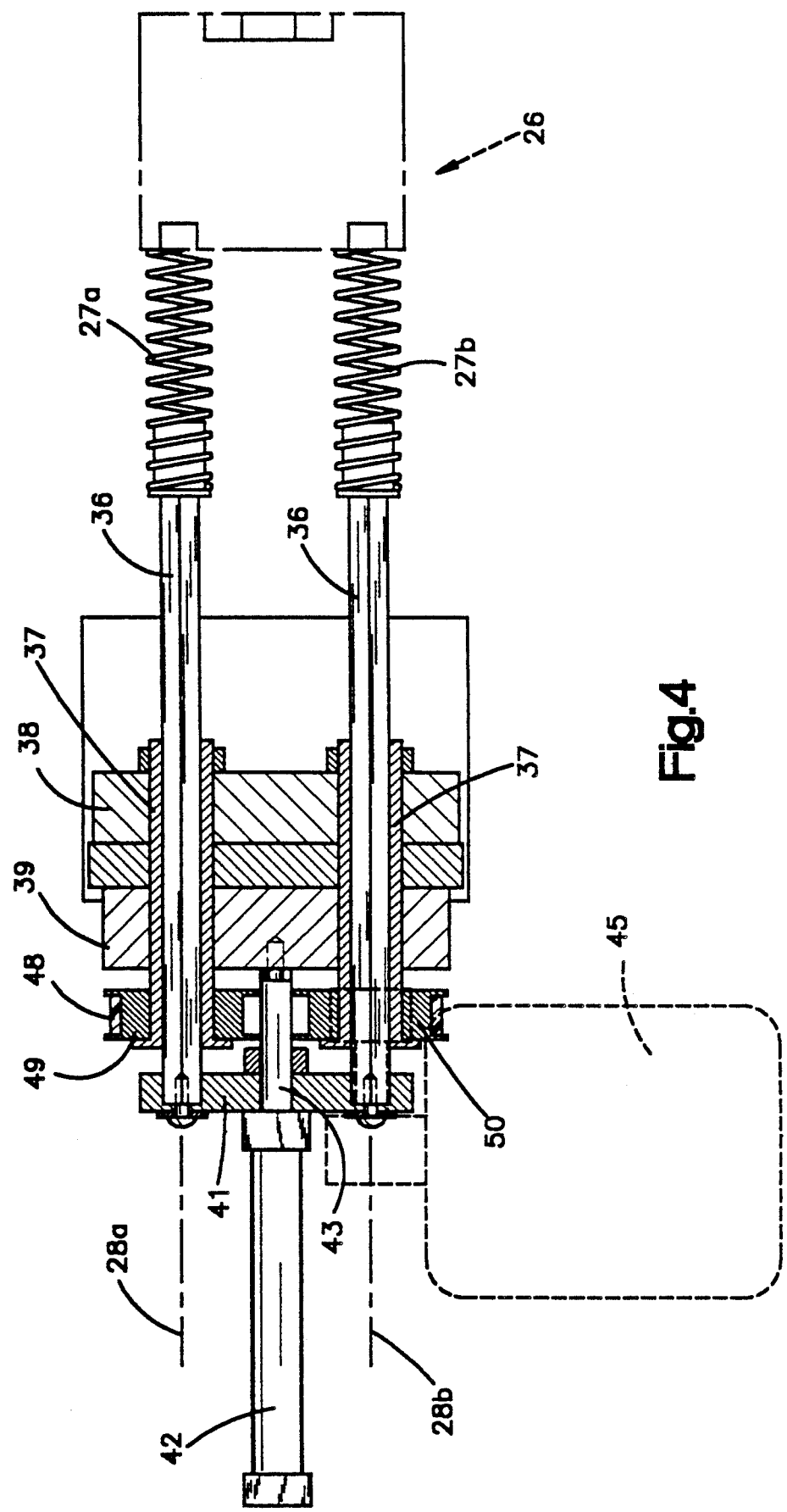
FIG. 4 is a plan view of two of the helical pick-ups illustrated in FIG. 3.

Referring now to FIGS. 3 and 4, each of the pick-ups 27a, 27b and 27c is mounted on an associated noncircular support rod 36. In the illustrated embodiment the support rods are provided with a hexagonal cross-section. The support rods extend rearwardly through mating support tubes 37 which are journaled in associated bearing members 38 and 39 for rotation about their respective axes 28a through 28c. In FIG. 4, only the support for the two pick-ups 27a and 27b is illustrated in order to simplify the drawings. However, a similar support structure is provided for the pick-up 27c, so the structural description of the support for the pick-ups 27a and 27b applies similarly to the support structure for the pick-ups 27c.

The interior of the support tubes 37 is provided with a cross section similar to the cross section of the support rods 36. Therefore, as the support tubes rotate, the associated support rods are caused to rotate. However, the support rods are free to move axially within the associated support tubes.

The ends of the support rods 36 are journaled in a cross-head member 41 and are free to rotate relative thereto. Cross-head member 41 is secured to the end of a cylinder 42 of a piston and cylinder actuator. The cylinder rod 43 of such actuator is mounted in the bearing block 39, so that when the actuator is operated, the cylinder 42 moves back and forth in a direction parallel to the axes 28a and 28b, causing the cross-head, and in turn the pick-ups, to move axially backward and forward between a retracted position illustrated in FIG. 1 and an extended position illustrated in FIGS. 3 and 4.

Motors are mounted below the cross-head member 41 and provide drive pulleys 47. Belts 48 extend around the drive pulleys 47 and over driven pulleys 49 through 51. One of such pulleys is mounted on each support tube 37 and is fixed against rotation relative to the associated support tube so that the motors 46 function to rotate the associated support tubes, and therefore rotate the associated support rods. With this structure, each of the pick-ups is rotated about its axis and is movable forward and backward between a retracted and extended position.

Figure 5:
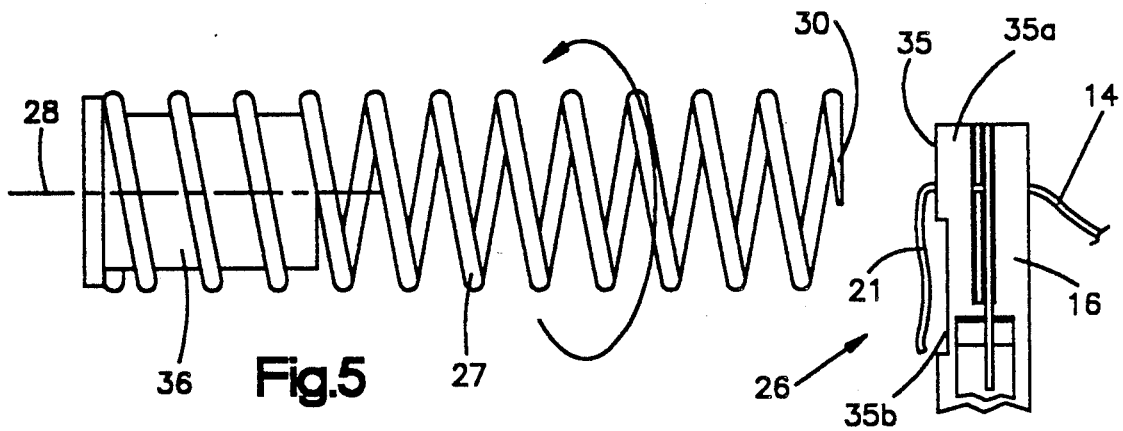
FIG. 5 illustrates one helical pick-up in its retracted position prior to capture of an associated lead.
Figure 5A:
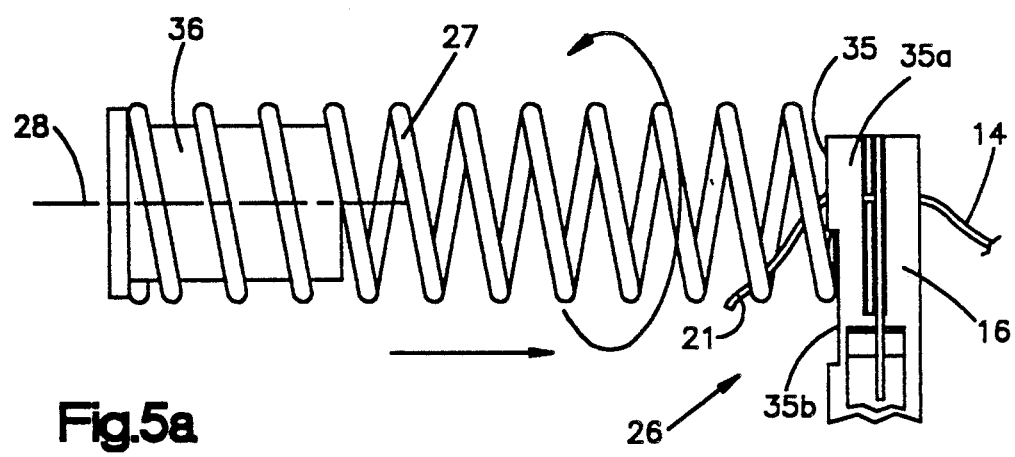
FIG. 5a is a fragmentary view similar to FIG. 5 but illustrating the helical pick-up in its extended capture position after engagement with an associated lead.
Figure 5B:
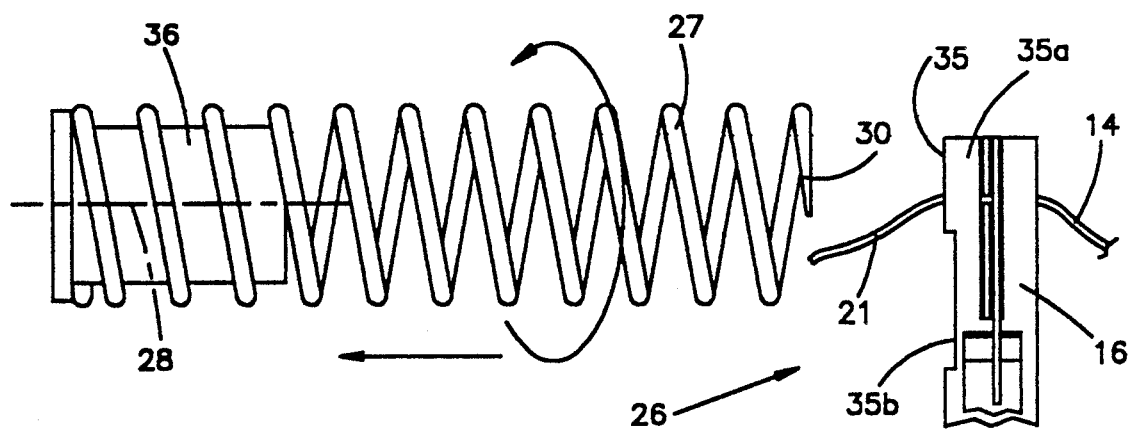
FIG. 5b is a fragmentary, schematic view similar to FIGS. 5 and 5a, illustrating the partially straightened lead after the helical pick-up retracts.

The manner in which the pick-ups function to capture and partially straighten the free ends 21 of the associated leads is best illustrated in FIGS. 5, 5a and 5b. Prior to capturing the free end 21 of the lead 14, such lead extends through the associated post 16, with the free end 21 extending downwardly along the forward surface of the post. Initially, the pick-up tool 27 is rotating about its axis 28 and is retracted back from the retainer post, as best illustrated in FIG. 5.

The cylinder 42 operates to move the pick-up 27 toward its extended position illustrated in FIG. 5a and in such position the forward end 30 of the pick-up is moved forward a sufficient amount to extend past an end face 35 on a projection 35a and into a shallow recess 35b formed in the retainer post 16. The helix of the pick-up 27 is sized so that the diameter of the forward end 30 is greater than the maximum lateral dimension of the projection 35a so that it clears the sides and projection 35a. In its extended position, the forward end 30 projects into recess 35b to ensure that the free end 21 of the lead is captured.

The rotation of the pick-up 27 causes the free end to be threaded along the length of the pick-up 27, as best illustrated in FIG. 5a. This draws the free end out away from the retainer post. After the capture of the free end, the pick-up is retracted, as illustrated in FIG. 5b, and the free end 21 extends generally perpendicular to the forward face of the retainer post 16. It should be noted that even though it is typical for the free ends to be in a downwardly extending position, the pick-up can engage and capture free ends of the leads in virtually any position which they may extend from the grippers per se. Thus, the pick-up can capture randomly positioned free ends, and can therefore function with full reliability.

After the lead has been partially straightened at the work station 26, the conveyor 12 moves the pallets 11 to the final straightening and trimming station 31 illustrated in FIG. 6. Located at such station are straightening and trimming devices schematically illustrated in FIG. 6. Here again, similar operating systems are provided on each side of the pallet.

Mounted on the frame 51 are a pair of substantially similar but opposite straightening assemblies 52a and 52b. Each of the assemblies is mounted on an associated support rail 53a and 53b so that the two assemblies can move laterally toward and away from the pallet 11. A piston and cylinder actuator assembly 54 is connected to each of the assemblies and is operable to move the assemblies toward and away from the pallet. In FIG. 6, the assemblies are illustrated in their forward position closely adjacent the pallets.

Supported on each of the assemblies 52a and 52b is an upper straightener blade 32 connected to the piston of an associated actuator and air spring 56 for vertical movement. Also mounted on each of the assemblies 52a and 52b is a lower straightener blade 33 which is supported for vertical movement by an associated piston and cylinder pneumatic spring 57. As best illustrated in FIG. 1, the lower gripper members 33 are provided with "V" notches 58 in their upper edges to assist in the capture of the partially straightened free ends of the leads. During initial gripping, the blades 32 and 33 are immediately adjacent to the retainer posts. At such location, the free end of the leads is in a position which is essentially constant even though the position of the remainder of the free end can differ. Therefore, since the grippers initially grip adjacent the retainers, the "V" notches ensure reliable gripping. A spring-loaded pressure pad 33a is carried with each associated blade 33 and is spring-biased to an extended position in which it engages the underside of the lead (as best illustrated in FIG. 7).

The actuators 57 and the actuator pneumatic spring 56 are connected to a source of pressure 59 through a valve 63. In the case of the springs 56, the valve 63 is connected through a pressure reducing regulator 61 and a bypass valve 62 which can operate to bypass the regulator. The actuators 57 are directly connected to the source of pressure 59 through the valve 63.

The operation of the final straightener and trimming assemblies is best illustrated in FIGS. 7 through 7d. The upper and lower gripper blades 32 and 33 are in their retracted position as the pallet moves to the final straightening and trimming position 31. Further, the two assemblies are moved toward the pallet so that the two gripper blades 32 and 33 are immediately adjacent to the associated retainer posts 16. In such position, the partially straightened free end 21 of the associated lead 14 is positioned between the two gripper blades and pressure pad 33a and in substantial alignment with the associated "V" notch 58.

The first step of the operation involves the opening of the valve 63 to pressurize the actuator springs 56 of the upper blades and the actuators 57 of the lower gripper blades. The stroke of the actuator 57 is such that it brings the lower blade and pressure pad up against the lower side of the associated free end 21, as best illustrated in FIG. 7a. The stroke of the upper actuator spring 56, however, is such that if sufficient force were applied, it would move the upper blade 32 down along the lower blade and cut off the lead 14. At this point in the operating cycle, however, the valve 62 remains closed and the pressure supplied by the regulator 61 is sufficiently low so that the lead is merely gripped at a low force level and is not cut.

While the lead is gripped between the two gripper blades and the pressure pad, the actuator 54 is operated to move the two assemblies 52a and 52b away from their associated retainer posts. This movement while the associated leads are gripped causes complete straightening of the portion 63 of the lead immediately adjacent to the associated retainer post 16, as illustrated in FIG. 7b.

Figure 7B:
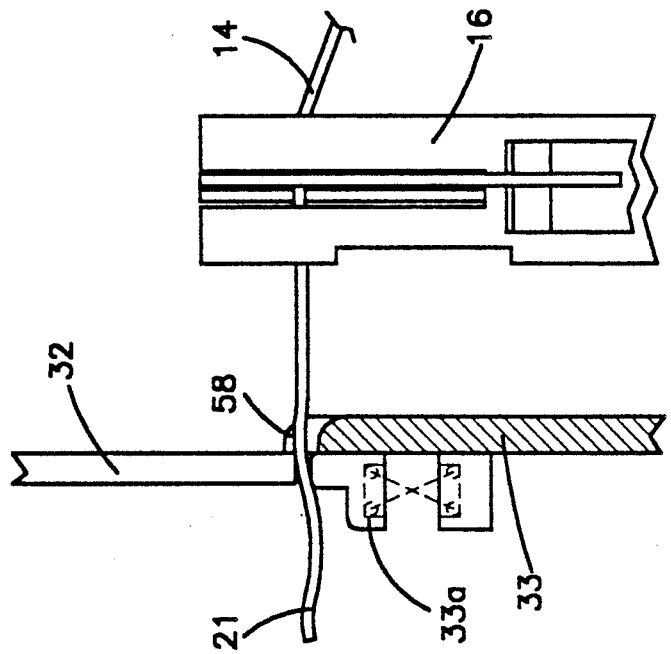
FIG. 7b is a fragmentary view similar to FIGS. 7 and 7a after the straightener cutter blades have moved laterally to straighten a portion of the lead.
Figure 7A:
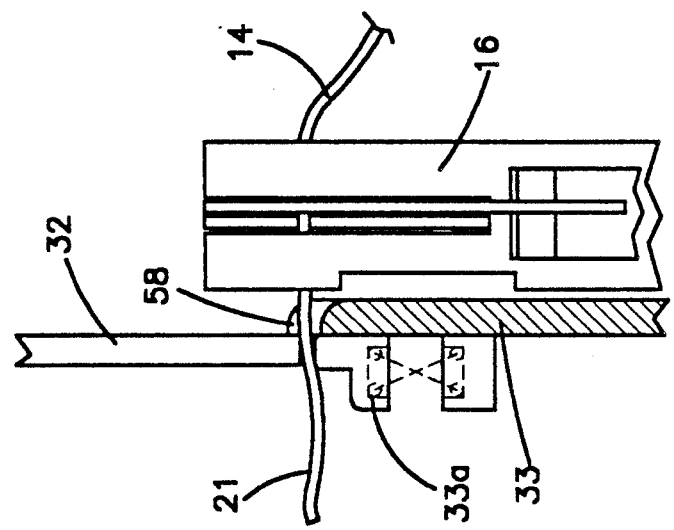
FIG. 7a is a view similar to FIG. 7, illustrating the straightener cutter blades at the moment of gripping.
Figure 7:
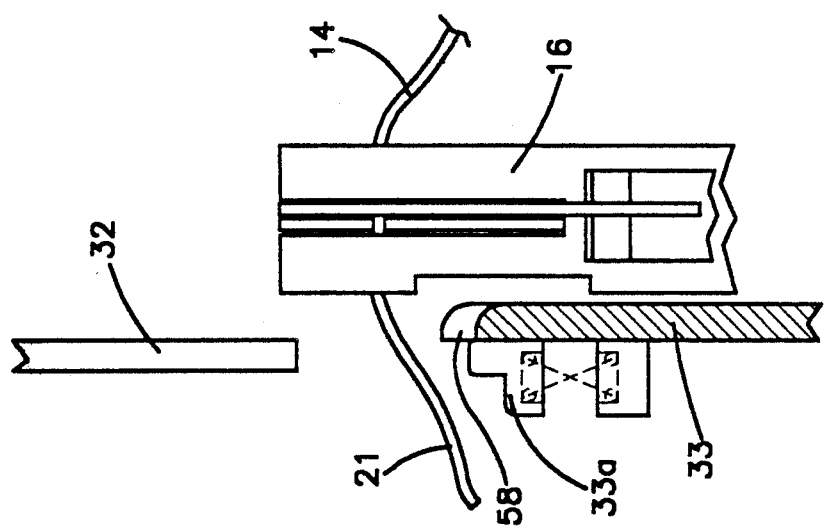
FIG. 7 is an enlarged fragmentary view, illustrating the straightener cutter blades prior to their engagement with the partially straightened lead.

After the straightening movement as illustrated in FIG. 7b, the actuators 56 and 57 are depressurized, allowing the grippers to release the lead. This releases the tension in the leads, as illustrated in FIG. 7c, so that when it is finally cut it will have a predetermined length extending beyond the associated retainer post.

After the tension in the lead has been released as illustrated in FIG. 7C, the two actuators 56 and 57 are again operated However, at this time both of the valves 62 and 63 are opened so that full pressure is applied to the actuator 56 and sufficient force is transmitted to the upper gripper blade 32 to cause the lead to be cut as illustrated in FIG. 7d. As the upper blade moves down, cutting the lead, the pressure pad 33a is pressed back against its spring bias. However, the pressure pads 33a support the portion of the associated lead extending beyond the lower cutter to improve the cut by preventing the lead from bending down along the face of the lower blade 33. At this time, a predetermined length of lead extends straight out from the associated retainer post so that the lead can be finished in any desired manner, usually by applying a connector to the lead.

With this invention, a simple, reliable mechanism functions to capture the free ends of the leads and to straighten and accurately trim the leads in a fully automated reliable manner.

Although the preferred embodiment of this invention has been shown and described, it should be understood that various modifications and rearrangements of the parts may be resorted to without departing from the scope of the invention as disclosed and claimed herein.

What is claimed is:

1. A method of finishing wire leads of electrical components when said leads are held in retainers and provide free ends randomly extending from said retainers, comprising capturing said free ends in a pick-up tool, retracting said pick-up tool to move said free ends to a gripping position in which said free ends extend generally in a predetermined direction from said retainers, while said free ends are in said gripping position gripping said free ends with grippers, applying tension to said free ends with said grippers thereby straightening portions of said free ends extending from said retainers, and cutting said free ends with said grippers at least adjacent said portion leaving straightened portions extending from said retainer in a predetermined direction through a predetermined distance.

2. A method as set forth in claim 1, including gripping said free ends with said grippers adjacent said retainers, and moving said grippers away from said retainers to apply tension to said free ends to straighten said portions.

3. A method as set forth in claim 2, including sliding said grippers along said portions to bare the wire of said portion.

4. A method as set forth in claim 1, including providing a pick-up tool which is an open helix, and rotating said pick-up tool as it engages an associated free end to capture said associated free end and to move it into general alignment with said pick-up tool.

5. A method as set forth in claim 1, wherein said electrical component is a motor component having coils installed therein, and including supporting said electrical component on pallets having positioning means which position said coils in said motor component and also position said motor component on said pallet.

6. A method as set forth in claim 5, wherein said motor component is a stator and said positioning means are posts extending through said stator and positioning said coils therein.

7. A method of finishing wire leads of electrical components having leads held by retainers and free ends extending from said retainers, comprising gripping said free ends in gripper cutters with a gripping force insufficient to cut said free ends, applying tension to the portions of said free ends between said gripper cutters and said retainers to straighten said portions, and thereafter cutting said leads with said gripper cutters to provide a straight portion of lead extending from said retainer in a predetermined direction therefrom.

8. A method as set forth in claim 7, including operating said gripper cutters to release said leads to eliminate tension in said leads before cutting said leads so that said straightened and cut leads extend a predetermined distance from said retainers.

9. A method of straightening lead wires positioned in retainers and extending therefrom in random directions, comprising the steps of capturing said leads in a rotatable helical pick-up while said helical pick-up is in an extended position adjacent said retainer, retracting said pick-up from said retainer to move said leads to positions extending from said retainer generally in a predetermined direction therefrom, thereafter gripping said leads with a gripper adjacent said retainer and retracting said gripper along said predetermined direction pulling at least a portion of said leads straight, and thereafter trimming said leads along said straight portion thereof.

10. A lead straightening apparatus for leads of electrical components which are held in a retainer and provide free ends randomly extending from said retainer, comprising a helical pick-up, a pick-up drive rotating said pick-up while moving said pick-up between a retracted position spaced from said retainer and an extended position adjacent to said retainer, said pick-up operating while extended to capture said leads adjacent to said retainer and move said free ends of said leads out from said retainer to a gripping position, and a combination straightener and cutter operable to grip said leads in said gripping position adjacent to said retainer, said combination straightener and cutter then retracting away from said retainer while exerting sufficient gripping force to produce a straight portion of said free end adjacent to said retainer, said combination straightener cutter thereafter operating to cut the lead along said straightened portion.

11. An apparatus as set forth in claim 10, wherein said electrical component is a stator with coils installed therein, and said apparatus includes pallets for supporting said stators, said pallets including positioning means extending through said stators to position said stators on associated pallets and also position said coils in said stators.

12. An apparatus for capturing leads of electrical components supported in a retainer and having free ends extending from said retainer in random directions, comprising a retainer providing a portion projecting in a predetermined direction to a face from which the associated of said free ends projects, a rotating pick-up member movable to an extended pick-up position and providing an end movable around said projection operable to engage and capture said associated free end, said pick-up operating to move said associated free end to predetermined positions relative to said retainer for subsequent operations.

13. An apparatus as set forth in claim 12, wherein said apparatus includes straightening means operating to engage said free ends in said predetermined positions and straighten at least a portion thereof.

14. An apparatus as set forth in claim 12, wherein said apparatus includes straightening and cutting means operating to thereafter straighten a portion of said associated free end extending from said retainer and to cut off unstraightened parts of said free end.

15. An apparatus as set forth in claim 12, wherein said pick-up member is an open helix having a diameter at said end larger than the maximum lateral dimension of said projection adjacent to said face.

16. A lead straightening apparatus for straightening leads positioned in a retainer and extending in random directions therefrom, comprising a rotating helical pick-up movable to an extended position adjacent said retainer operable to capture said leads and movable to a retracted position causing said leads to extend from said retainer generally in a predetermined direction, gripper and cutter means movable to a gripping position adjacent said retainer to grip said lead and retractable from said retainer while gripping said lead to straighten at least a portion of said lead and position said portion along said predetermined direction, said gripper and cutter means operating to cut said lead along said straightened portion a predetermined distance from said retainer.

17. A lead straightening apparatus as set forth in claim 16, wherein said gripper and cutter means are operated by an actuator operating to cause said gripping at a first force level insufficient to cut said free end and operating thereafter at a higher force level to cut said free end.

18. A lead straightening apparatus as set forth in claim 18, wherein an actuator causes said gripper and cutter means to release said gripping of said free end before cutting said free end.

* * * * *

UNITED STATES PATENT AND TRADEMARK OFFICE
CERTIFICATE OF CORRECTION

PATENT NO. : 4,991,631

DATED : February 12, 1991

INVENTOR(S) : Robert J. Eminger, et al.

It is certified that error appears in the above-identified patent and that said Letters Patent is hereby corrected as shown below:

Column 10, Line 6, "claim 18" should read --claim 16--.

Signed and Sealed this

Twenty-eighth Day of July, 1992

Attest:

DOUGLAS B. COMER

Attesting Officer     Acting Commissioner of Patents and Trademarks